United States Patent
Day et al.

(10) Patent No.: US 6,934,871 B2
(45) Date of Patent: Aug. 23, 2005

(54) PROGRAMMABLE COUNTERS FOR SETTING BUS ARBITRATION DELAYS INVOLVES COUNTING CLOCK CYCLES EQUAL TO A COUNT NUMBER LOADED FROM A MEMORY

(75) Inventors: Brian A. Day, Colorado Springs, CO (US); Robert E. Ward, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 753 days.

(21) Appl. No.: 09/860,149

(22) Filed: May 17, 2001

(65) Prior Publication Data

US 2003/0009706 A1 Jan. 9, 2003

(51) Int. Cl.[7] .................................................. G06F 1/04
(52) U.S. Cl. ...................................... 713/502; 713/600
(58) Field of Search ................................. 713/502, 600, 713/500; 711/167

(56) References Cited

U.S. PATENT DOCUMENTS

| | | | | |
|---|---|---|---|---|
| 4,720,681 A | * | 1/1988 | Sinclair ....................... 324/339 |
| 5,778,194 A | * | 7/1998 | McCombs .................... 713/600 |
| 5,821,992 A | * | 10/1998 | Saylor .......................... 348/164 |
| 5,974,086 A | * | 10/1999 | Oliboni et al. .............. 375/225 |
| 6,321,342 B1 | * | 11/2001 | Day et al. .................... 713/600 |
| 6,438,670 B1 | * | 8/2002 | McClannahan .............. 711/167 |
| 6,629,270 B1 | * | 9/2003 | Ophir et al. .................. 714/43 |

FOREIGN PATENT DOCUMENTS

JP          63-200221     *   8/1988

OTHER PUBLICATIONS

Chang et al., "A 723–MHz 17.2–mW CMOS Programmable Counter", IEEE Journal of Solid–State Circuits, vol. 33, No. 10, Oct., 1998, pp 1572–1575.*

* cited by examiner

*Primary Examiner*—Chun Cao
(74) *Attorney, Agent, or Firm*—Yee & Associates

(57) ABSTRACT

A method and apparatus for generating a delay in the timing of a bus or other logic circuit such that changes may be made to timing parameters without undue hardware design changes is disclosed. A counter is used to count a number of clock cycles to time the delay. The number of clock cycles is pre-loaded into the counter from a memory. This eliminates the need for costly hardware design changes when timing parameters change, since all that must be changed is the number of clock cycles to be counted, which can be modified by replacing or reprogramming the memory.

20 Claims, 4 Drawing Sheets

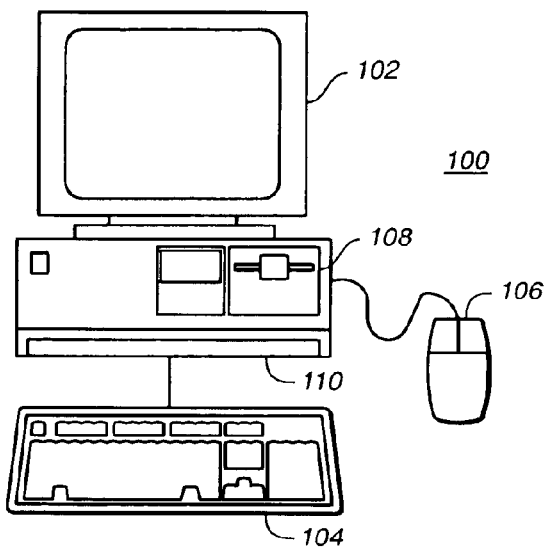
FIG._1
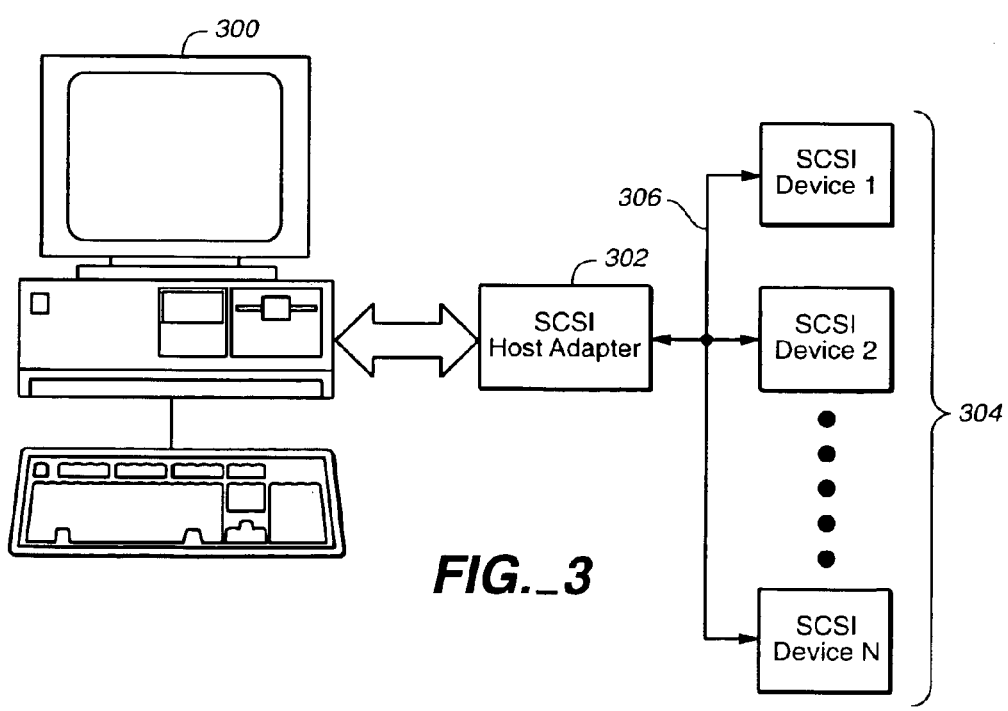
FIG._3

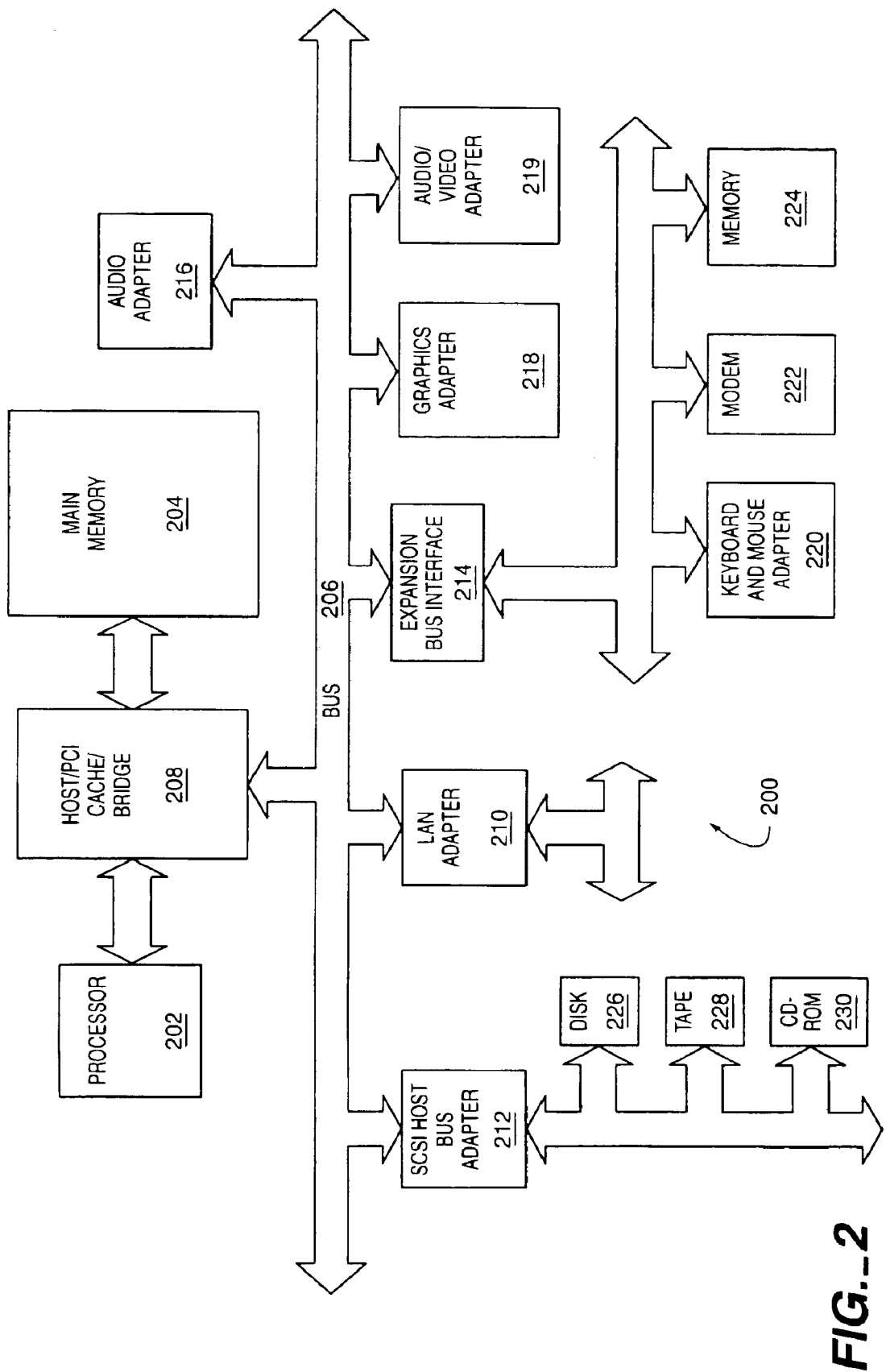
FIG._2

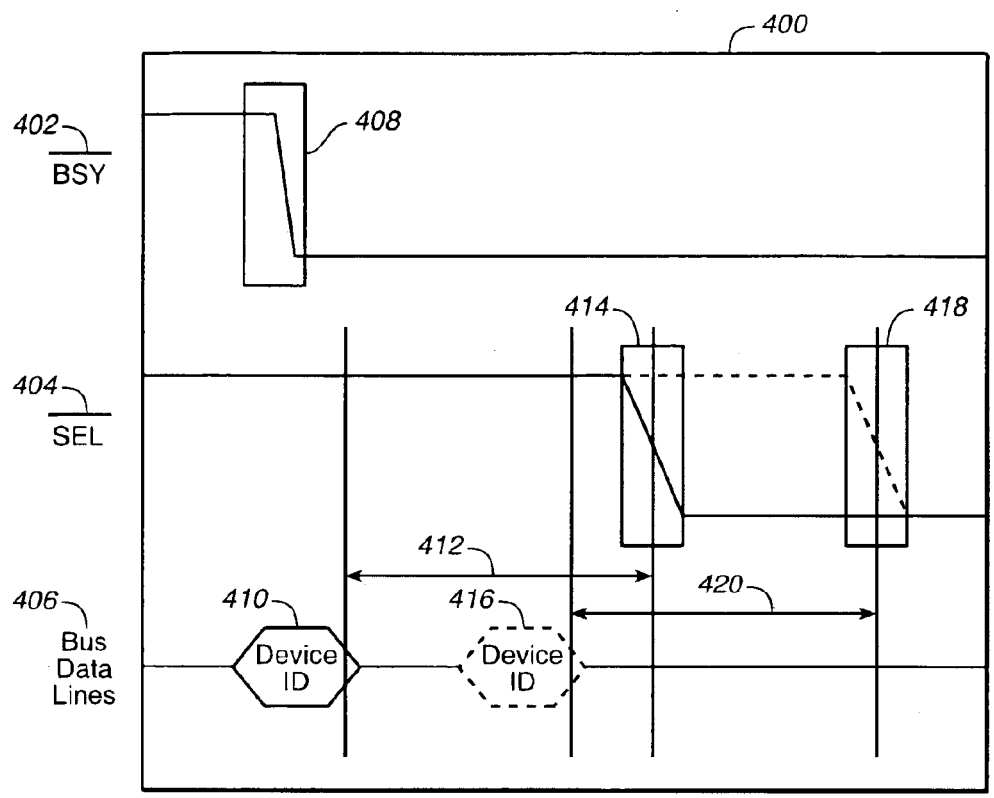
FIG._4
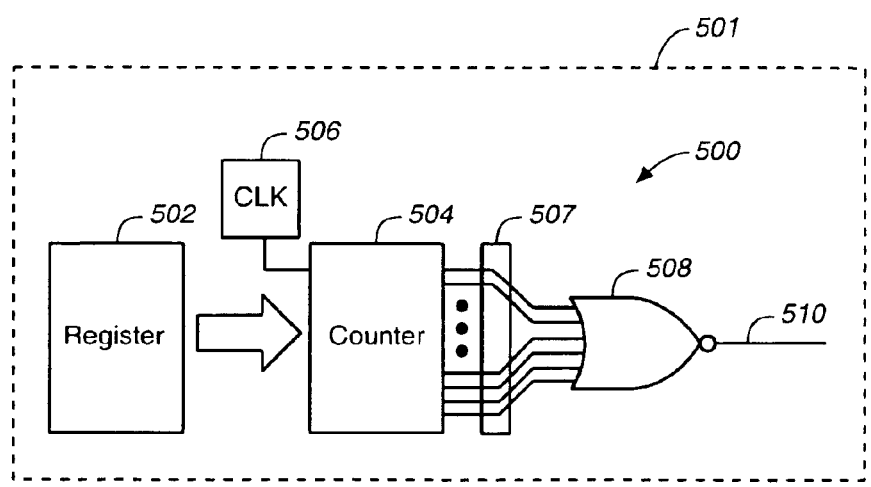
FIG._5

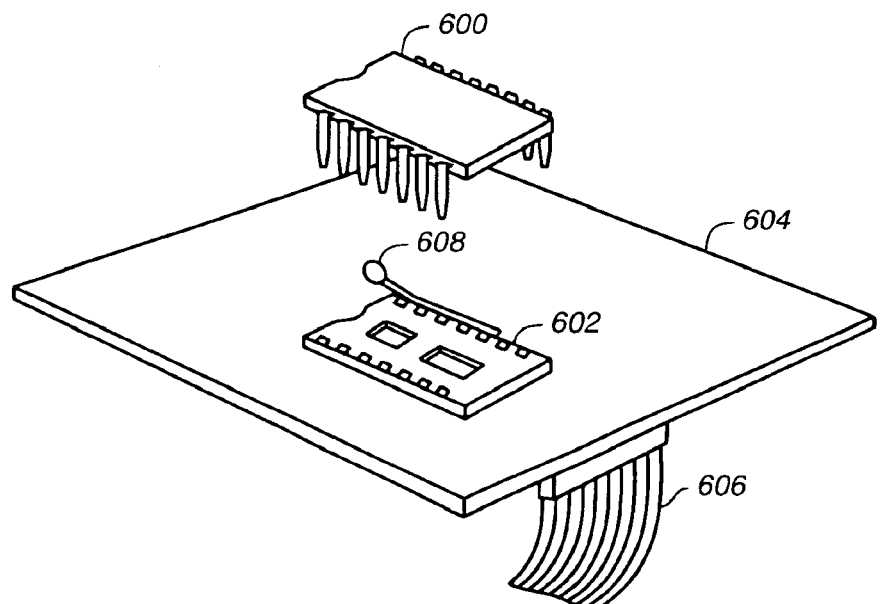
FIG._6
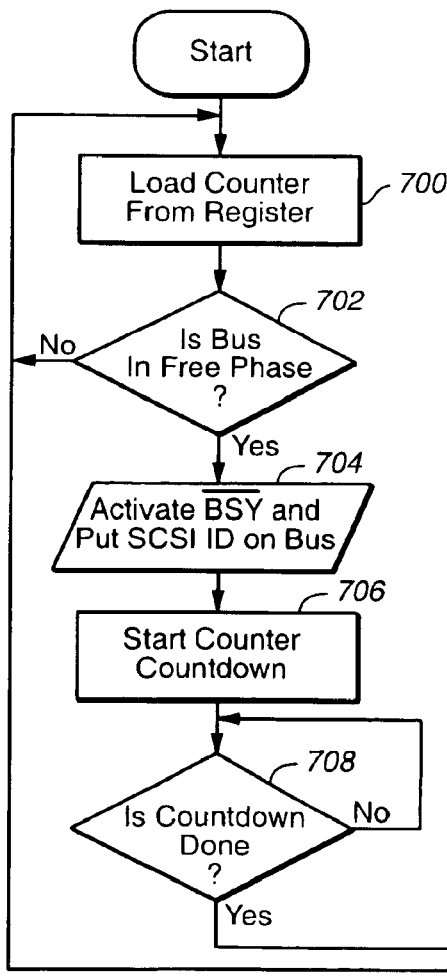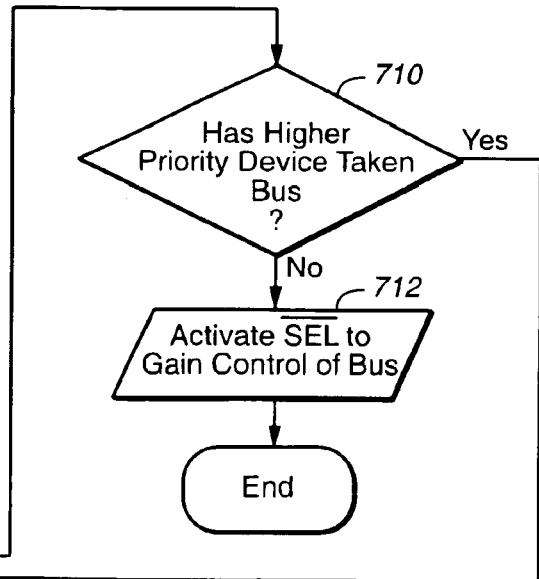
FIG._7

PROGRAMMABLE COUNTERS FOR SETTING BUS ARBITRATION DELAYS INVOLVES COUNTING CLOCK CYCLES EQUAL TO A COUNT NUMBER LOADED FROM A MEMORY

BACKGROUND OF THE INVENTION

1. Technical Field

The present invention is directed generally toward a method and apparatus for generating a delay in bus signals. More specifically, the present invention is directed toward a method and apparatus for generating a delay, wherein the delay periods may be easily changed when bus specifications are updated.

2. Description of the Related Art

A typical computer system includes a central processing unit (CPU) for performing computations, memory, and peripheral devices such as display monitors, printers, and disk drives for offline storage and communication with the outside world. Without something to interconnect these components, however, they cannot function as a system.

The primary apparatus for the interconnection of components in a computer system is known as a bus. A bus is a group of signals that allows for communication between devices. A bus is like a data expressway, where the computer system components are positioned at the entrance and exit ramps. For instance, the central processing unit, memory, and peripheral devices may all be connected in parallel to a single bus.

Several different levels of buses may exist in a computer system. At the lowest level is the component-oriented (local) bus, which connects directly to the CPU. Component-oriented buses are generally specific to the particular type of CPU being used. For instance, the component-oriented bus in a computer system built around a Pentium microprocessor (CPU) is incompatible with a PowerPC microprocessor (CPU).

In many computers, however, there are two or more levels of buses (particularly in more modern computer systems). The component-oriented bus is often supplemented with a backplane or system bus. A backplane bus does not interface directly with the CPU, but is connected to the component-oriented bus by means of a backplane-to-host bridge.

Using a backplane bridge has a number of advantages, but two of them are of particular importance. First, because backplane buses are not connected to the component-oriented bus and CPU directly, when a component on the backplane bus fails, there is less likelihood of complete system failure, because the failure is isolated. Second, because backplane buses need not be specific to a particular model of processor, it is possible to have backplane bus standards that are independent of the choice of processor. This allows peripheral devices such as input/output (I/O) adapters to be interchangeable among disparate computing platforms.

One level further out from backplane buses are peripheral bus systems. Peripheral bus systems are true buses, but they are generally accessed through an input/output adapter situation on a backplane bus. Peripheral buses are commonly used to control storage devices, such as floppy disk drives and hard drives. Popular peripheral bus standards include the Small Computer System Interface (SCSI) standard and the Universal Serial Bus (USB) standard.

In all standard bus systems, there are various timing specifications that must be complied with. For example, in the SCSI peripheral bus standard, when one or more devices need to control the bus, a process known as arbitration must take place so that only one device on the bus is allowed to control the bus at any one time. This and other processes within the SCSI standard require the introduction of various delays in the timing of bus signals. Typically, these delays are regulated by custom hardware specifically designed to conform to the bus standard's specifications.

Bus standards, however, are not static entities. They evolve over time. When timing specifications associated with a bus standard change, therefore, hardware designed to conform to the bus standard must be updated to take into account the changes. When custom designed hardware must be redesigned to effect the changes, it can be a very time-consuming process. What is needed, then, is delay-producing circuitry that can be updated without expensive hardware changes.

SUMMARY OF THE INVENTION

The present invention provides a method and apparatus for generating a delay in the timing of a bus or other logic circuit such that changes may be made to timing parameters without undue hardware design changes. The present invention uses a counter to count a number of clock cycles to time the delay. The number of clock cycles is pre-loaded into the counter from a memory. The present invention thus eliminates the need for costly hardware design changes when timing parameters change; all that must be changed is the number of clock cycles to be counted, which can be modified by replacing or reprogramming the memory.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a diagram of a computer system in which the present invention may be implemented;

FIG. 2 is a block diagram of a data processing system in which the present invention may be implemented;

FIG. 3 is a block diagram of a SCSI bus system in accordance with a preferred embodiment of the present invention;

FIG. 4 is a timing diagram depicting SCSI bus arbitration in accordance with a preferred embodiment of the present invention;

FIG. 5 is a diagram of a counter-based delay generation circuit in accordance with a preferred embodiment of the present invention;

FIG. 6 is a diagram of an integrated circuit apparatus in which the present invention may be implemented; and FIG. 7 is a flowchart representation of a SCSI bus arbitration in accordance with a preferred embodiment of the present invention.

DETAILED DESCRIPTION

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

Data processing system 200 may also include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface.

The depicted example in FIG. 2 and above-described examples are not meant to imply architectural limitations. For example, data processing system 200 also may be a notebook computer or hand held computer. Data processing system 200 also may be a kiosk or a Web appliance.

FIG. 3 is a diagram depicting the overall architecture of a Small Computer System Interface (SCSI) bus system in accordance with a preferred embodiment of the present invention. Computer system 300 engages in bi-directional communication with SCSI host adapter 302. SCSI host adapter 302 operates on a peer-relationship basis with SCSI devices 304 through SCSI bus 306. SCSI bus 306 contains a number of signal lines for both transmitting data and controlling the flow of that data among the devices (including SCSI host adapter 302 and SCSI devices 304) on SCSI bus 306.

In order to ensure that the data transmitted over SCSI bus 306 does not become garbled, it is essential that only one device or the host adapter be permitted to transmit data over the bus at any one time. A "SCSI bus arbitration protocol" thus exists to allow the assignment of control over SCSI bus 306 to only one device at a time. Each of SCSI devices 304 and SCSI host adapter 302 has an assigned priority. If more than one device needs to transmit data on SCSI bus 306, the SCSI bus arbitration protocol allows the devices to compete for control. The winner is always the device with the highest pre-assigned priority.

FIG. 4 provides a simplified timing diagram 400 depicting the operation of the SCSI bus arbitration protocol in accordance with a preferred embodiment of the present invention. Diagram 400 includes signals /BSY 402 (busy signal), /SEL 404 (select signal), and SCSI bus data lines 406, which are all signals of SCSI bus 306 (in FIG. 3). Signals /BSY 402 and /SEL 404 are active-low signals. That is, they show an "active" status when brought to a low logic level. /BSY 402 is asserted (brought to a low logic level) when information is being sent over bus data lines 406. /SEL 404 is asserted by a device when that device takes control of SCSI bus 306.

A device needing to take control of SCSI bus 306 first waits until both /BSY 402 and /SEL 404 are inactive (high logic level). Then, when /BSY 402 and /SEL 404 are both inactive, the device asserts /BSY 402 by bringing it to a low logic level (shown at 408). This can be done by using the output of an open-collector or open-source logic circuit to bring /BSY 402 to low logic level. Then, the device transmits a device ID on bus data lines 406 (shown at 410). This is also known as putting the ID "on the bus."

After an arbitration delay 412 elapses, if no higher-priority device has placed its ID on the bus, then the device wins the arbitration and asserts /SEL 404 (shown at 414). If, on the other hand, another higher-priority device places its ID on the bus at a time during arbitration delay 412 (shown at 416), the original device will lose the arbitration, and the higher priority device will assert /SEL 404 (shown at 418) after its arbitration delay 420 has elapsed.

The actual lengths of arbitration delay 412 and arbitration delay 420 are governed by minimum or maximum values listed in the current SCSI specification document. Because SCSI is an evolving standard, the delay values are subject to change as the specification is updated. The present invention provides a method and apparatus for generating these delays, wherein delay times may be easily updated when a new specification has been released.

FIG. 5 is a diagram of a subcircuit 500, incorporated into a SCSI device 501, for generating an arbitration delay in accordance with an embodiment of the present invention. Register 502 holds a counter pre-load value, which is loaded into a binary counter 504 as its initial counter value. Clock 506 provides a square wave signal to counter 504 at a predetermined frequency. On each falling edge of a clock cycle from clock 506, counter 504 decrements its counter value by one. The current counter value can be read at any time from outputs 507 of counter 504. When counter 504 finally reaches a counter value of zero, outputs 507 will all be at low logic level (representing a binary zero). Since all of outputs 507 are fed into NOR gate 508, output 510 of NOR gate will be at high logic level if and only if outputs 507 read zero.

Thus, to generate an arbitration delay of a particular time, a count of the number of clock cycles contained in the proper arbitration delay period is pre-loaded from register 502 to counter 504. Since outputs 507 will read a non-zero value, output 510 will be at a low logic level. Then, counter 504 can be enabled and clock signals from clock 506 will decrement counter 504 over the delay period. When counter 504 reaches binary zero, output 510 will change to a high logic level, denoting the end of the delay period. Thus, changing the delay period is simply a matter of modifying the pre-load value stored in register 502.

FIG. 6 depicts an implementation of register 502 so as to allow for easy modification in the event that specified delay times change, in accordance with a preferred embodiment of the present invention. Integrated circuit 600 contains programmable memory circuitry for storing the pre-load value used by counter 504. This programmable memory circuit may be made up of programmable read-only memory (PROM), eraseable programmable read-only memory (EPROM), flash memory, non-volatile random-access memory (NVRAM) or other similar programmable memory. In addition, the programmable memory circuit may be made up of random-access memory (RAM) and programmed after the SCSI device has powered up. Integrated circuit 600 may also contain other circuitry, such as counter 504 or other control circuitry.

Integrated circuit 600 is designed to be inserted into a socket 602 mounted on a circuit board 604. Circuit board 604 is depicted as connected to further circuitry through a ribbon connector 606. Socket 602 is depicted here as a zero-insertion force (ZIF) socket, a type of integrated circuit socket that allows an integrated circuit, such as integrated circuit 600, to be inserted, locked into place with latch 608, then unlatched and removed.

Adjustment of delay times in a SCSI device may be performed using an apparatus as shown in FIG. 6 in a number of ways. If integrated circuit 600 contains programmable memory such as PROM or EPROM memory, which must be programmed using a special programming device, integrated circuit 600 can be removed from socket 602 and reprogrammed with a PROM/EPROM programmer (not shown). If integrated circuit contains some sort of self-programmable memory such as NVRAM or flash memory, circuitry on circuit board 604 or connected to ribbon connector 606 could direct integrated circuit 600 to reprogram itself with a new counter pre-load value. It is also possible to simply replace integrated circuit 600 with a new integrated circuit with different settings programmed into it.

One of ordinary skill in the art will appreciate that present invention not only is advantageous in the case that an existing SCSI device must be updated, but also in the case in which a manufacturer is assembling new SCSI devices. Since timing changes need only be programmed into an integrated circuit memory, no redesigning of circuitry is necessary to effect a change in timing parameters in an existing product. One can use identical circuitry with only the memory programming changed. This can provide tremendous convenience and savings to a manufacturer.

FIG. 7 is a flowchart representation of the operation of bus arbitration in an embodiment of the present invention within a SCSI device. First, he counter pre-load value is loaded from its storage register into the counter (step 700). Then, the SCSI device must determine whether the bus is in the "bus free" phase, meaning that /BSY and /SEL are not asserted (step 702). When the bus enters the bus free phase, the device asserts /BSY and puts its SCSI device ID on the bus (step 704). Then the counter is activated and begins to count down (step 706). When the countdown is complete (step 708), a determination is made as to whether a higher priority device has taken the bus (step 710). If so, then the process cycles to step 700 to wait for another opportunity to gain control of the bus. If, on the other hand, no higher-priority device has attempted to take the bus, the original device activates /SEL to gain control of the bus (step 712).

One of ordinary skill in the art will appreciate that the techniques of the present invention are applicable to other delay times that must be accounted for within the SCSI specification. Although arbitration delay was chosen as a clear example of the applicability of the present invention, a number of other delays must also be accounted for in the SCSI specification. These include bus clear delay, bus free delay, but set delay, bus settle delay, data release delay, QAS (Quick Arbitrate and Select) arbitration delay, QAS assertion delay, QAS release delay, reset delay, selection time-out delay, and system deskew delay. These delays are described in detail in the SCSI Parallel Interface Specification. Because the present invention provides a general programmable delay capability, the present invention can be used to generate these delays as well. A bank of multiple counters and registers may be used to produce multiple delays, if necessary.

One of ordinary skill in the art will also recognize that the present invention has a wider range of applicability than simply SCSI bus arbitration. There are numerous hardware/software protocols, particularly bus protocols such as Peripheral Component Interconnect (PCI) and the like, where a convenient programmable delay generation technique is needed. The present invention is applicable in any signal timing application where an easily modified delay period is useful.

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method for generating a delay in a logic circuit, comprising the steps of:

loading a count number from a memory;

counting a number of clock cycles equal to the count number, wherein the count number corresponds to a specified delay in a bus protocol; and responsive to a completion of counting the number of clock cycles, asserting a signal.

2. The method of claim 1, wherein the count number corresponds to one of a bus arbitration delay, a bus clear delay, a bus free delay, a bus set delay, a bus settle delay, a data release delay, a QAS (Quick Arbitrate and Select) arbitration delay, QAS assertion delay, a QAS release delay, a reset delay, a selection time-out delay, and a system deskew delay.

3. The method of claim 1, wherein the bus protocol is a Small Computer System Interface (SCSI) bus protocol.

4. The method of claim 1, wherein the counting step includes a step of loading the count number into a counter.

5. The method of claim 1, wherein the signal is a select signal.

6. An apparatus for generating a delay in a logic circuit, comprising means for:

loading a count number from a memory;

counting a number of clock cycles equal to the count number, wherein the count number corresponds to a specified delay in a bus protocol; and responsive to a completion of counting the number of clock cycles, asserting a signal.

7. The apparatus of claim 6, wherein the count number corresponds to one of a bus arbitration delay, a bus clear delay, a bus free delay, a bus set delay, a bus settle delay, a data release delay, a QAS (Quick Arbitrate and Select) arbitration delay, QAS assertion delay, a QAS release delay, a reset delay, a selection time-out delay, and a system deskew delay.

8. The apparatus of claim 6, wherein the bus protocol is a Small Computer System Interface (SCSI) bus protocol.

9. The apparatus of claim 6, wherein the means for counting includes means for loading the count number into a counter.

10. The apparatus of claim 6, wherein the signal is a select signal.

11. An apparatus for generating a delay, comprising:

a memory containing a count number;

a clock;

a counter; and a logic circuit, wherein the counter loads the count number from the memory, the counter counts a number of clock cycles from the clock that is equal to the count number, wherein the count number corresponds to a specified delay in a bus protocol, and responsive to completing counting the number of clock cycles, the logic circuit asserts a signal.

12. The apparatus of claim 11, wherein the count number corresponds to one of a bus arbitration delay, a bus clear delay, a bus free delay, a bus set delay, a bus settle delay, a data release delay, a QAS (Quick Arbitrate and Select) arbitration delay, QAS assertion delay, a QAS release delay, a reset delay, a selection time-out delay, and a system deskew delay.

13. The apparatus of claim 11, wherein the bus protocol is a Small Computer System Interface (SCSI) bus protocol.

14. The apparatus of claim 11, wherein the counting step includes a step of loading the count number into a counter.

15. The apparatus of claim 11, wherein the signal is a select signal.

16. The apparatus of claim 11, wherein the memory is non-volatile memory.

17. The apparatus of claim 11, wherein the memory includes one of programmable read-only memory (PROM), eraseable programmable read-only memory (EPROM), flash memory, non-volatile random-access memory, and random-access memory.

18. The apparatus of claim 11, wherein the memory is formed of an integrated circuit.

19. The apparatus of claim 11, further comprising a peripheral device.

20. The apparatus of claim 19, wherein the peripheral device is a Small Computer System Interface (SCSI) device.

* * * * *